United States Patent
Milsom

(10) Patent No.: US 9,315,260 B2
(45) Date of Patent: *Apr. 19, 2016

(54) LANDING GEAR ELECTRICAL SWIVEL

(71) Applicant: Goodrich Corporation, Charlotte, NC (US)

(72) Inventor: Derek C Milsom, ON (CA)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,956

(22) Filed: Nov. 3, 2015

(65) Prior Publication Data

US 2016/0052622 A1  Feb. 25, 2016

Related U.S. Application Data

(62) Division of application No. 14/223,882, filed on Mar. 24, 2014, now Pat. No. 9,214,777.

(51) Int. Cl.
*B64C 25/14* (2006.01)
*B64C 25/00* (2006.01)
*H01R 39/08* (2006.01)

(52) U.S. Cl.
CPC .............. *B64C 25/001* (2013.01); *H01R 39/08* (2013.01)

(58) Field of Classification Search
None
See application file for complete search history.

(56) References Cited

U.S. PATENT DOCUMENTS

| 2,404,969 | A | * | 7/1946 | Liddington | H01R 39/08 310/232 |
|---|---|---|---|---|---|
| 4,137,474 | A | * | 1/1979 | Krieger | H02K 9/28 310/227 |
| 4,410,821 | A | * | 10/1983 | Kurt | H01R 39/08 310/227 |
| 5,054,189 | A | * | 10/1991 | Bowman | H01R 43/10 29/525 |
| 5,104,063 | A | * | 4/1992 | Hartley | B64C 25/40 244/103 R |
| 5,704,792 | A | * | 1/1998 | Sobhani | H01R 39/64 439/21 |
| 5,734,218 | A | * | 3/1998 | Crockett | H01R 39/08 29/597 |
| 6,068,490 | A | * | 5/2000 | Salzberg | H01R 39/64 439/22 |
| 2002/0102867 | A1 | * | 8/2002 | Rutten | H01R 39/08 439/26 |

(Continued)

FOREIGN PATENT DOCUMENTS

| GB | 2459199 | 10/2009 |
|---|---|---|
| WO | 2012084218 | 6/2012 |

OTHER PUBLICATIONS

Extended European Search Report dated Aug. 4, 2015 in European Application No. 15158460.4.

(Continued)

*Primary Examiner* — Medhat Badawi
(74) *Attorney, Agent, or Firm* — Snell & Wilmer L.L.P.

(57) ABSTRACT

An electrical swivel system may have a movable swivel member adapted to connect to a landing gear and a fixed swivel member adapted to connect to an airframe. Each may have an interface apparatus whereby electrical signals may be conducted between components of the movable swivel member and the fixed swivel member. In this manner, electrical signals may be conveyed across a mechanically movable joint.

9 Claims, 8 Drawing Sheets

(56) References Cited

U.S. PATENT DOCUMENTS

| | | | | |
|---|---|---|---|---|
| 2003/0111928 A1* | 6/2003 | Bowman | H01R 39/08 | 310/232 |
| 2005/0000084 A1* | 1/2005 | Barbet | H01R 39/39 | 29/596 |
| 2005/0269449 A1* | 12/2005 | Muylaert | B64C 1/062 | 244/100 R |
| 2005/0269450 A1* | 12/2005 | Muylaert | B64C 1/062 | 244/118.1 |
| 2005/0269453 A1* | 12/2005 | Muylaert | B64C 25/68 | 244/129.1 |
| 2005/0279882 A1* | 12/2005 | Muylaert | B64C 1/062 | 244/100 R |
| 2005/0279883 A1* | 12/2005 | Muylaert | B64C 1/062 | 244/100 R |
| 2005/0279884 A1* | 12/2005 | Tebon | B64C 25/00 | 244/100 R |
| 2005/0279885 A1* | 12/2005 | Tebon | B64C 25/00 | 244/100 R |
| 2007/0284478 A1* | 12/2007 | Soderberg | B64C 25/36 | 244/103 R |
| 2008/0121162 A1* | 5/2008 | Erstad | B63B 21/507 | 114/230.12 |
| 2008/0284584 A1* | 11/2008 | Coleman | H01R 39/08 | 340/531 |
| 2009/0091208 A1* | 4/2009 | Yu | H01R 39/08 | 310/232 |
| 2009/0261203 A1* | 10/2009 | Gouette | B64C 25/58 | 244/137.1 |
| 2010/0327111 A1* | 12/2010 | Sanderson | B64C 9/22 | 244/99.3 |
| 2011/0177697 A1* | 7/2011 | Cairns | H01R 13/523 | 439/18 |
| 2011/0210644 A1* | 9/2011 | Krogh | H01R 39/08 | 310/232 |
| 2012/0200194 A1* | 8/2012 | Schwery | H02K 13/006 | 310/227 |
| 2012/0270415 A1* | 10/2012 | Lenker | H01R 43/10 | 439/13 |
| 2014/0375062 A1* | 12/2014 | Beekmann | H01R 39/08 | 290/55 |
| 2015/0027256 A1* | 1/2015 | Rodrigues | F16H 1/06 | 74/411.5 |
| 2015/0059163 A1* | 3/2015 | Neumann | H02K 3/51 | 29/596 |
| 2015/0061705 A1* | 3/2015 | Angerpointner | H01R 39/08 | 324/691 |
| 2015/0101180 A1* | 4/2015 | Neumann | H02K 15/0006 | 29/597 |
| 2015/0129313 A1* | 5/2015 | Zacharko | H01R 39/46 | 175/73 |
| 2015/0270672 A1* | 9/2015 | Milsom | H01R 39/08 | 439/18 |

OTHER PUBLICATIONS

USPTO; Notice of Allowance dated Aug. 28, 2015 in U.S. Appl. No. 14/223,882.

USPTO; Supplemental Notice of Allowability dated Sep. 16, 2015 in U.S. Appl. No. 14/223,882.

USPTO; Supplemental Notice of Allowability dated Nov. 13, 2015 in U.S. Appl. No. 14/223,882.

* cited by examiner

LANDING GEAR ELECTRICAL SWIVEL

CROSS REFERENCE TO RELATED APPLICATIONS

This application claims priority to and is a divisional application of U.S. patent application Ser. No. 14/223,882 entitled "Landing Gear Electrical Swivel" and filed Mar. 24, 2014, which issued as U.S. Pat. No. 9,214,777 on Dec. 15, 2015, the contents of which are hereby incorporated by reference in its entirety.

FIELD

The present disclosure relates to electric connectors, and more specifically, to electric connectors that may swivel.

BACKGROUND

There is often a need to make an electrical connection between two moving structures. For example, current landing gear designs implement a flexible electrical wire harness that may dynamically move within the space of the aircraft landing gear bay whenever the landing gear is extended or retracted. However, often there is little available space to route an electrical harness with sufficient harness bend radii to ameliorate the risk of harness failure. Furthermore, in some airframes, decreased size of the landing gear bay may not contain sufficient room to route such a harness.

SUMMARY

In various embodiments, an electrical swivel system is provided. An electrical swivel system may have a movable swivel member. The movable swivel member may have a movable member mounting apparatus adapted to mount the movable swivel member to a landing gear, an external gear connector through which electrical signals may be conducted, and a movable member interface apparatus. The electrical swivel system may have a fixed swivel member having a fixed member mounting apparatus adapted to mount the fixed swivel member to an airframe, an external aircraft connector through which electrical signals may be conducted, and a fixed member interface apparatus. The movable member interface apparatus may have a movable track having a moveable track electrical contact. The fixed member interface apparatus may have a fixed track having a fixed track electrical contact. The movable track electrical contact may contact the fixed track electrical contact so that electrical current may be conducted therebetween. The movable swivel member and the fixed swivel member may have complementary shapes so that the movable swivel member nests within the fixed swivel member. The movable swivel member may travel along an arc length between a first end of the fixed swivel member and a second end of the fixed swivel member. In various embodiments, an aircraft landing gear system may have a landing gear having a first portion of an electrical system, an airframe having a second portion of the electrical system, and an electrical swivel system whereby electric signals are conducted from the first portion of the electrical system to the second portion of the electrical system.

In various embodiments, an aircraft landing gear system may have a landing gear having a first portion of an electrical system, an airframe having a second portion of the electrical system, and an electrical swivel system having a movable swivel member in electrical communication with the first portion of the electrical system and a fixed swivel member in electrical communication with the second portion of the electrical system. Electric signals may be conducted from the first portion of the electrical system to the second portion of the electrical system. The movable swivel member may travel along an arc length between a first end of the fixed swivel member and a second end of the fixed swivel member. The movable swivel member and the fixed swivel member may have complementary shapes whereby the movable swivel member nests within the fixed swivel member.

In various embodiments, the movable swivel member has a movable member mounting apparatus adapted to mount the movable swivel member to the landing gear, an external gear connector in electrical communication with the first portion of the electrical system and through which electrical signals may be conducted, and a movable member interface apparatus. The fixed swivel member may have a fixed member mounting apparatus adapted to mount the fixed swivel member to the airframe, an external aircraft connector in electrical communication with the second portion of the electrical system and through which electrical signals may be conducted, and a fixed member interface apparatus. The movable member interface apparatus may have a movable track having a moveable track electrical contact, and the fixed member interface apparatus may have a fixed track having a fixed track electrical contact. The movable track electrical contact may contact the fixed track electrical contact so that electrical current may be conducted therebetween.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
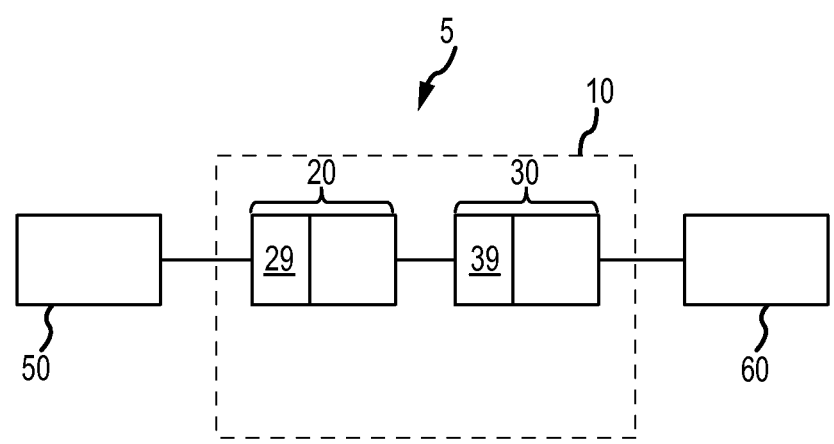
FIG. 1 illustrates functional relationships between various aspects of an aircraft having a landing gear electrical swivel installed in accordance with various embodiments.
Figure 3:
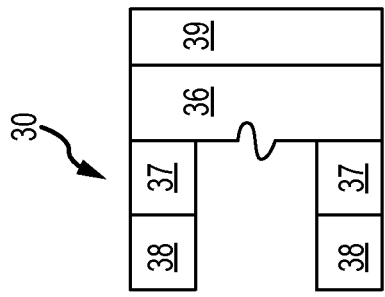
FIGS. 2-5 illustrates functional relationships between various components of a landing gear electrical swivel in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

In various embodiments, the present disclosure provides an electrical swivel system with reduced footprint. In this regard, a single electrical swivel system may conduct multiple currents and signals while beneficially decreasing the space in the landing gear storage bay occupied by the conducting hardware.

In various embodiments, an aircraft landing gear system may comprise a landing gear, an electrical swivel system, and an airframe. Moreover, an electrical swivel system may comprise a movable swivel member and a fixed swivel member. For example, with reference to FIG. 1, an aircraft landing gear system 5 comprises a landing gear 50, an airframe 60, and an electrical swivel system 10 comprising a movable swivel member 20 and a fixed swivel member 30.

In various embodiments, a movable swivel member may comprise an external gear connector, a movable member interface apparatus, and a movable member mounting apparatus. For example, with reference to FIGS. 1, 2, 4, and 6, in various embodiments, a movable swivel member 20 comprises a landing gear connector 25, a movable member interface apparatus 26, and a movable member mounting apparatus 29.

Similarly, in various embodiments, a fixed swivel member may comprise an external aircraft connector, a fixed member interface apparatus, and a fixed member mounting apparatus. For example, with reference to FIGS. 1, 3, 5, and 6, in various embodiments, a fixed swivel member 30 may comprise an external aircraft connector 35, a fixed member interface apparatus 36, and a fixed member mounting apparatus 39.

With reference to FIG. 1, movable member mounting apparatus 29 may mechanically attach movable swivel member 20 to landing gear 50. Similarly, fixed member mounting apparatus 39 may mechanically attach fixed swivel member 30 to airframe 60. In this manner, movable swivel member 20 may move with the landing gear as it extends and retracts, while fixed swivel member 30 may remain stationary with respect to the airframe 60. Movable swivel member 20 and fixed swivel member 30 may be in movable mechanical communication, so that an electrical current or signal may be passed between components of movable swivel member 20 and components of fixed swivel member 30, even while movable swivel member 20 moves relative to fixed swivel member 30, for example, upon extension or retraction of landing gear 50 relative to airframe 60.

In various embodiments, movable member mounting apparatus 29 may comprise apertures and bolts, or may comprise welds, rivets, quick release fasteners, or may comprise any other mechanism by which the movable swivel member 20 may be mounted to the landing gear 50. Similarly, in various embodiments, fixed member mounting apparatus 39 may comprise apertures and bolts, or may comprise welds, rivets, quick release fasteners, or may comprise any other mechanism by which the fixed swivel member 30 may be mounted to the airframe 60.

As mentioned above, in various embodiments, movable swivel member 20 may also comprise an external gear connector. In various embodiments, fixed swivel member 30 may also comprise an external aircraft connector. For example, with reference to FIGS. 6-7, movable swivel member 20 may comprise a landing gear connector 25 and a movable member interface apparatus 26. Fixed swivel member 30 may comprise an external aircraft connector 35 and a fixed member interface apparatus 36.

Figure 6:
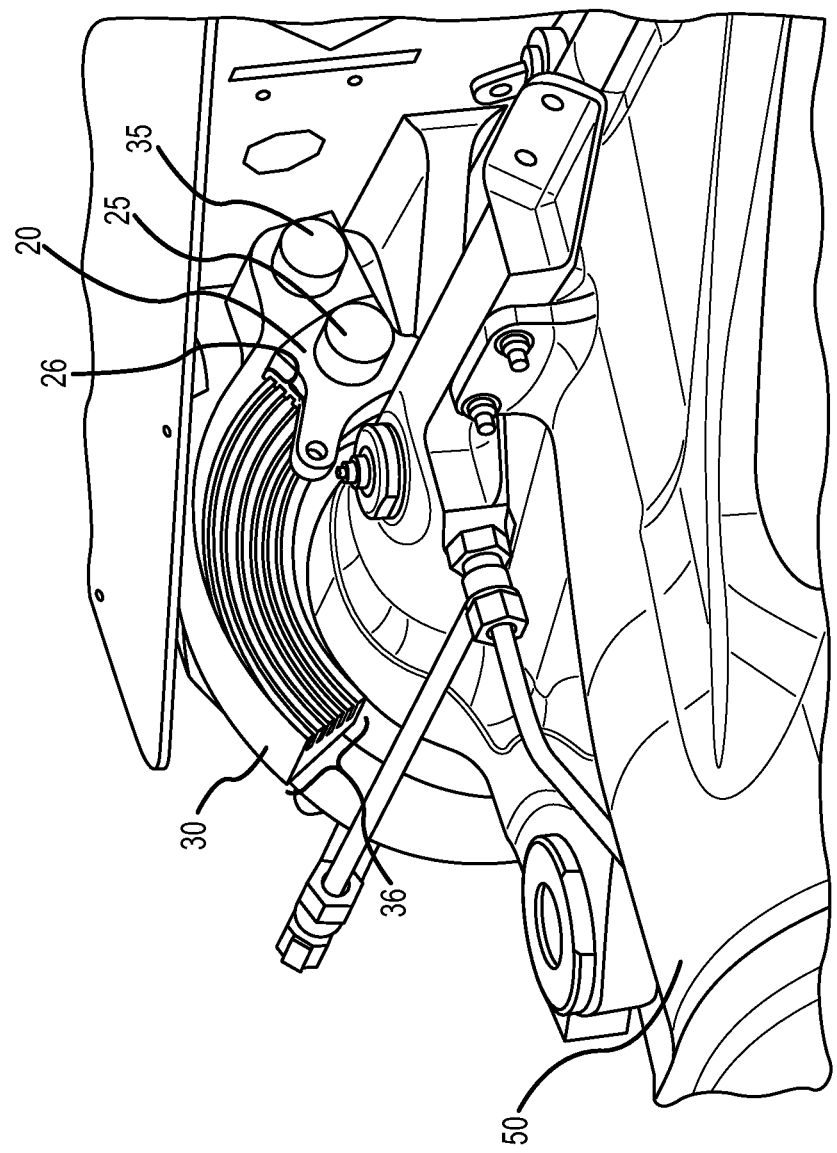
FIG. 6 illustrates a view of a landing gear electrical swivel installed on a landing gear in the gear-up position, in accordance with various embodiments.
Figure 7:
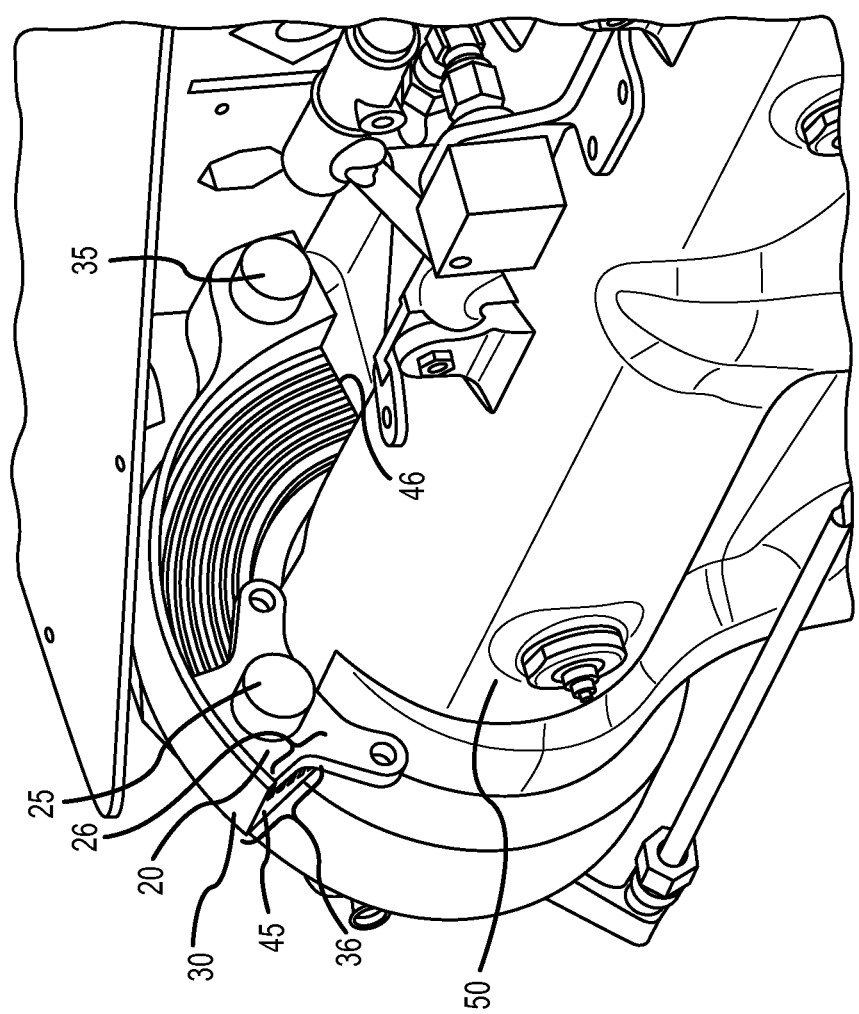
FIG. 7 illustrates a view of a landing gear electrical swivel installed on a landing gear in the gear-down position, in accordance with various embodiments.

A current or signal may be introduced at external aircraft connector 35 and conducted to fixed member interface apparatus 36, by internal wiring, for example, by wires, circuit board traces, and/or wire brushes. Fixed member interface apparatus 36 is mounted in rotatable mechanical communication with movable member interface apparatus 26, thus the current or signal is electrically conducted from components of fixed member interface apparatus 36 to corresponding components of movable member interface apparatus 26 regardless of the position to which movable member interface apparatus 26 is rotated. The current is then conducted from movable member interface apparatus 26 to landing gear connector 25 by internal wiring, for example, wires, circuit board traces, and/or wire brushes. In this manner, an electrical connection is substantially and continuously maintained across the landing gear joint, even when the landing gear is in motion between a gear-up and gear-down position. For example, FIG. 6 illustrates various elements when the landing gear 50 is in a gear-up position, and FIG. 7 illustrates these various elements when the landing gear 50 is in a gear-down position.

In various embodiments, landing gear connector 25 and external aircraft connector 35 may comprise signal connectors, or power connectors, or connectors conveying both signals and power. In various embodiments, external aircraft connector 35 and landing gear connector 25 may comprise connectors specified under Aeronautical Radio, Inc. (ARINC) standards. In various embodiments, external aircraft connector 35 and landing gear connector 25 may comprise an Amphenol Aerospace connector, available from Amphenol Corporation, Wallingford, Conn. In various embodiments, external aircraft connector 35 and landing gear connector 25 may comprise connectors from the D3999 connector series, although any suitable connector adapted for a desired operating environment may be used.

Figure 10:
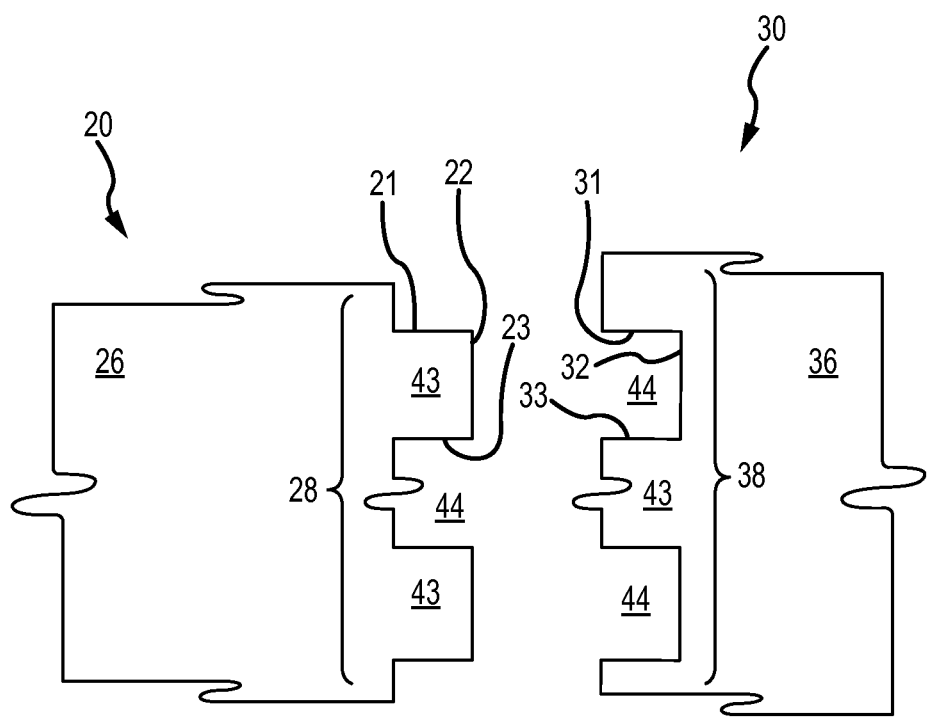
FIGS. 10-11 illustrate detail views of the electrical contacts of a landing gear electrical swivel in accordance with various embodiments.
Figure 11:
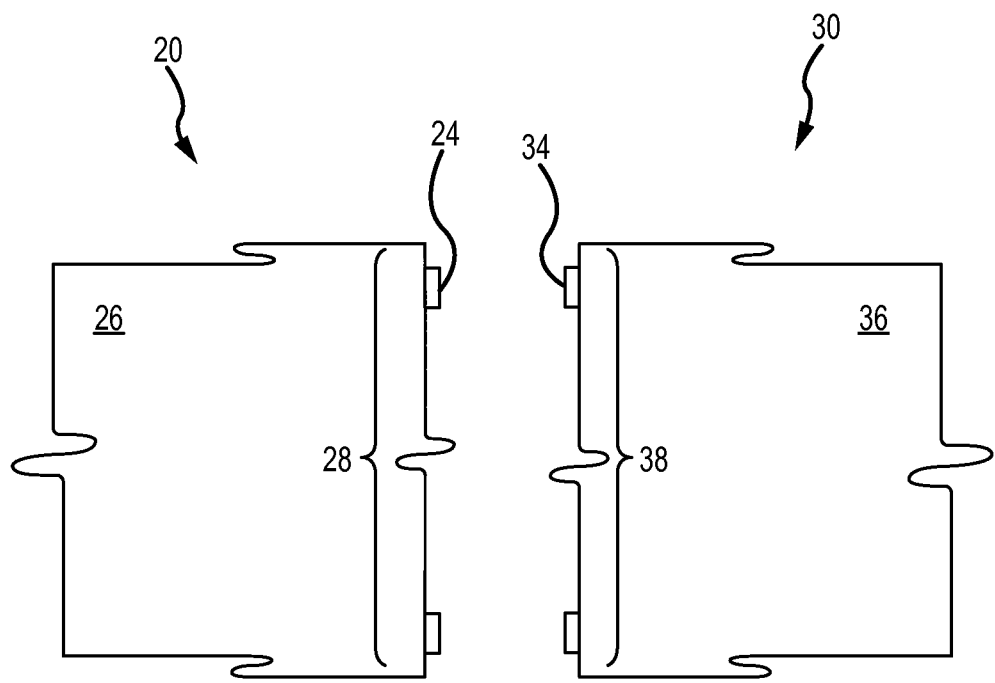

As mentioned above, in various embodiments, a fixed swivel member 30 may comprise a fixed member interface apparatus 36 and a movable swivel member 20 may comprise a movable member interface apparatus 26. With reference to FIGS. 10-11, a fixed swivel member 30 may comprise a fixed member interface apparatus 36 comprising a fixed track 38. Fixed track 38 may comprise electrical contacts adapted to interface with corresponding electrical contacts on movable swivel member 20. For instance, movable swivel member 20 may comprise a movable member interface apparatus 26 comprising a movable track 28. Movable track 28 may comprise electrical contacts adapted to interface with corresponding electrical contacts on fixed swivel member 30.

With particular reference to FIG. 10, in various embodiments, movable member interface apparatus 26 may comprise movable track 28 comprising a series of bosses 43 and valleys 44. Similarly, fixed member interface apparatus 36 may comprise a fixed track 38 comprising a series of bosses 43 and valleys 44 adapted to correspond to those of movable track 28. For example, with reference to FIG. 10, each boss 43 lands in a corresponding valley 44. In various embodiments, movable track 28 may comprise at least one electrical contact. For example, an electrical contact 21 may be placed on the upper sidewall of a boss 43. In various embodiments this electrical contact 21 conducts signals or current to an electrical contact 31 placed on a corresponding sidewall of a valley 44 of fixed track 38 adapted to correspond to movable track 28. In a similar manner, electrical contact 23 may be placed on a sidewall of a valley 44 of movable track 28 adapted to correspond to electrical contact 33 of fixed track 38.

In similar manner, contacts may be placed on the top of a boss 43 and the floor of a valley 44. For example, in various embodiments, an electrical contact 22 may be placed on the top side of a boss 43. In various embodiments this electrical contact 22 conducts signals or current to electrical contact 32 placed on a corresponding bottom of a valley 44 of fixed track 38 adapted to correspond to movable track 28 of movable member interface apparatus 26.

In various embodiments, electrical contact 21 and electrical contact 31 may conduct a different current or signal than electrical contact 22 and electrical contact 32. In various embodiments, electrical contact 21 and electrical contact 31 may conduct a different current or signal than electrical contact 23 and electrical contact 33. Alternatively, any number of contacts may conduct the same current or signal, or different currents or signals, depending on the properties desired. For example, multiple pairs of contacts may conduct the same current or signal in order to increase the current handling capacity of a circuit, or to decrease parasitic effects, or to achieve other desired electrical or magnetic behaviors. In various embodiments, 8 discrete signals/currents are conducted by an electrical swivel system.

With particular reference to FIG. 11, in various embodiments, movable member interface apparatus 26 may comprise movable track 28 comprising a substantially planar surface. Similarly, fixed member interface apparatus 36 may comprise a fixed track 38 comprising a substantially planar surface. In various embodiments, movable track 28 may comprise at least one electrical contact. For example, an electrical contact 24 may be placed on the planar surface of movable track 28. In various embodiments this electrical contact 24 conducts signals or current to an electrical contact 34 placed on a corresponding planar surface of fixed track 38 adapted to correspond to movable track 28.

In various embodiments, electrical contacts may be arranged in any manner adapted to maintain electrical continuity while the landing gear moves. For instance, in various embodiments, fixed track 38 and movable track 28 may comprise triangular ridges and troughs, or any shape, or a combination of shapes. Furthermore, fixed track 38 and movable track 28 may comprise shielding members, for example, unused troughs and/or valleys and/or grounded troughs and/or valleys. In various embodiments, interface apparatuses may comprise unused contacts and, optionally, shielding members, for instance, to ameliorate crosstalk, or to ameliorate parasitic inductance or capacitance, or to ameliorate arcing. In various embodiments, a fixed member interface apparatus 36 and/or movable member interface apparatus 26 may comprise shielding, for example, to provide isolation between classified and unclassified signals, or to provide isolation between high currents and small signals, or to satisfy Emission Security (EMSEC) standards, for example, to satisfy TEMPEST standards.

As discussed above, in various embodiments, a movable swivel member may comprise a tension member. For example, with reference to FIG. 2, a movable swivel member 20 may comprise a tension member 27 disposed between movable member interface apparatus 26 and movable track 28. In various embodiments, the tension member 27 is a spring. In this manner, force may be applied by a tension member 27 to movable track 28 to impel it to maintain electrical connectivity with fixed swivel member 30 (see FIG. 1). In various embodiments, a separate tension member 27 exists for each movable track 28, for example, so that each electrical contact is separately tensioned.

In various embodiments, a fixed swivel member may comprise a tension member. For example, with reference to FIG. 3, a fixed swivel member 30 may comprise a tension member 37 disposed between fixed member interface apparatus 36 and fixed track 38. In various embodiments, the tension member 37 is a spring. In this manner, force may be applied by a tension member 37 to fixed track 38 to impel it to maintain electrical connectivity with movable swivel member 20 (see FIG. 1). In various embodiments, a separate tension member 37 exists for each fixed track 38, for example, so each electrical contact is separately tensioned.

Figure 4:
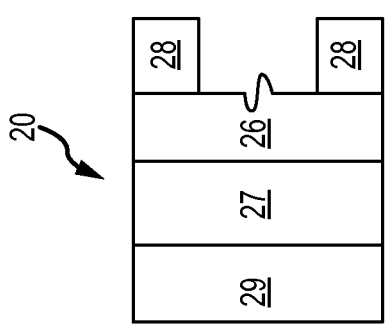

With reference to FIG. 4, in other various embodiments, a tension member 27 of a movable swivel member 20 may be disposed between a movable member mounting apparatus 29 and movable member interface apparatus 26. In this manner, force may be applied by a tension member 27 to movable member interface apparatus 26 to impel each movable track 28 to maintain electrical connectivity with fixed swivel member 30 (see FIG. 1). In various embodiments, a single tension member 27 exists for more than one movable track 28, for example, so that multiple electrical contacts are jointly tensioned.

Figure 5:
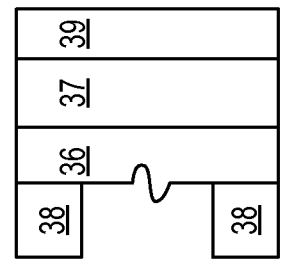
Figure 2:
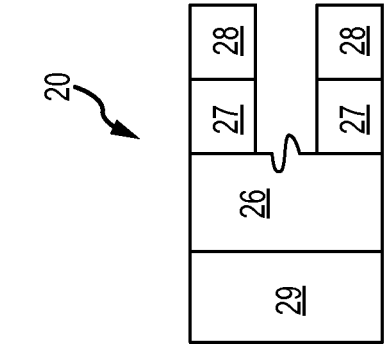

With reference to FIG. 5, in various embodiments, a tension member 37 of a fixed swivel member 30 may be disposed between a fixed member mounting apparatus 39 and fixed member interface apparatus 36. In this manner, force may be applied by a tension member 37 to fixed member interface apparatus 36 to impel each fixed track 38 to maintain electrical connectivity with movable swivel member 20 (see FIG. 1). In various embodiments, a single tension member 37 exists for more than one fixed track 38, for example, so multiple electrical contacts are jointly tensioned.

Thus, as one having ordinary skill in the art will appreciate, both the fixed swivel member and the movable swivel member may have tension members, or one may have a tension member and the other may not have a tension member. Moreover, one may have a single tension member for multiple fixed tracks or movable tracks, and one may have a separate tension member for each fixed track or movable track, or both may each have a single tension member for multiple fixed tracks or multiple movable tracks, or both may have a separate tension member for each fixed track or movable track. In this manner, any arrangement or combination of embodiments of tension members may be implemented.

Moreover, one having ordinary skill in the art will appreciate that a tension member may comprise a spring. In other various embodiments, a tension member may comprise an inherent elasticity manufactured into an electrical contact, for example, the contact may comprise a compressible bent portion whereby force may be exerted on the tip of the contact. Moreover, in various embodiments, the contact comprises a wire brush.

Figure 8:
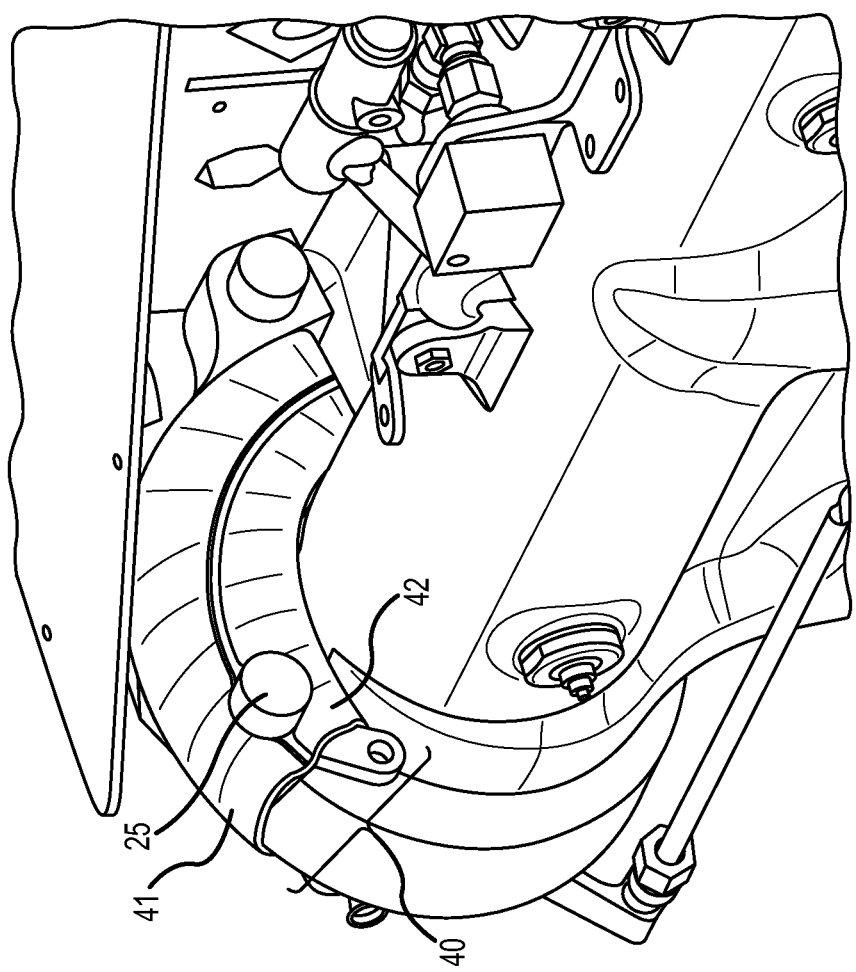
FIG. 8 illustrates a view of a landing gear electrical swivel having a cover and installed on a landing gear in the gear-down position, in accordance with various embodiments.
Figure 9:
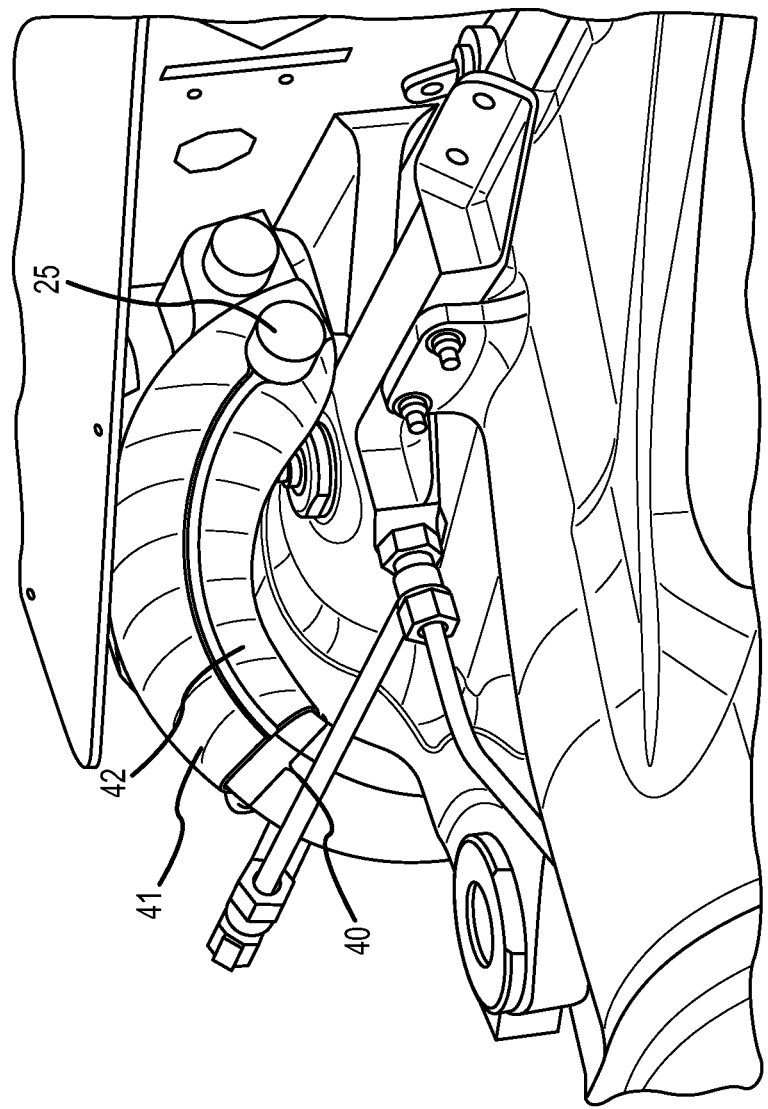
FIG. 9 illustrates a view of a landing gear electrical swivel having a cover and installed on a landing gear in the gear-up position, in accordance with various embodiments.

In various embodiments, an electrical swivel system 10 may comprise a cover, for example, to protect various aspects of the system from the elements, for example dirt, dust, grease, water, and other environmental concerns. With reference to FIGS. 8-9, an electrical swivel system is illustrated further comprising a cover 40. In various embodiments, the cover 40 comprises a first rubber portion 41 and a second rubber portion 42. In various embodiments, the cover substantially wraps around the electrical swivel system 10, for example, a first rubber portion 41 wrapping around one portion and a second rubber portion 42 wrapping around a second portion. In this manner, landing gear connector 25 may move while extended between first rubber portion 41 and second rubber portion 42 while electrical swivel system 10 remains substantially sealed. However, in various embodiments, the cover may comprise a metal cover, for example, a piece of pressed sheet metal bent to encompass the entire electrical swivel system. In various embodiments, the cover may also provide electrical shielding.

In various embodiments, the movable swivel member and the fixed swivel member comprise complementary shapes. For example, with reference to FIG. 7, the movable swivel member 20 and the fixed swivel member 30 may comprise complementary shapes so that the movable swivel member 20 may nest within the fixed swivel member 30. In various embodiments, to "nest" means that a portion of one member passes through a plane of at least a portion of the other member. In various embodiments, the movable swivel member 20 may nest in a portion of the fixed swivel member 30 as depicted in FIG. 7. In various embodiments, with reference to FIG. 10, the bosses 43 may be said to nest within the valleys 44.

In various embodiments, with reference to FIG. 7, the fixed swivel member 30 may comprise a first arc length. In other words, the fixed swivel member 30 may be shaped to follow a portion of the circumference of a circle. A fixed swivel member 30 may comprise an arc length of a circle centered on same axis as the landing gear 50. In this manner, the fixed swivel member 30 may comprise an arc length of a circle having a center disposed coincident with the axis about which landing gear 50 moves. In various embodiments, movable swivel member 20 may comprise a second arc length wherein the second arc length is shorter than the first arc length. In other words, the movable swivel member may be shaped to follow a portion of the circumference of the circle. A movable swivel member may comprise an arc length of the circle centered on the same axis as the landing gear 50. However, the movable swivel member 20 may comprise a shorter arc length than the fixed swivel member 30. In this manner, the movable swivel member 20 may curve identically to the fixed swivel member 30, but may be shorter than the fixed swivel member 30 so that it can travel to different points along fixed swivel member 30.

Thus, in various embodiments, the fixed swivel member 30 comprises a first arc length having a first end 45 and a second end 46 as depicted in FIG. 7. In various embodiments, the movable swivel member 20 travels between the first end and the second end of the fixed swivel member in response to the landing gear extending/retracting.

Now, having described various components of electrical swivel systems, an electrical swivel system may be manufactured from various materials. In various embodiments, an electrical swivel system may comprise metal. An electrical swivel system may comprise aluminum, titanium, tungsten, carbon steel, copper, or stainless steel, though it may further comprise numerous other materials configured to provide desirable characteristics. In various embodiments, various portions of electrical swivel system as disclosed herein are made of different materials or combinations of materials, and/or may comprise coatings.

In various embodiments, electrical swivel system may comprise multiple materials, or any material configuration suitable to enhance or reinforce the resiliency and/or support of the system when subjected to wear in an operating environment or to satisfy other desired electromagnetic, chemical, physical, or biological properties such as durability, signal isolation, dielectric constant, impedance, resistance, parasitic capacitance, parasitic inductance, parasitic diode effects, current handling capability, thermal dissipation, and footprint constraints, among others.

For example, in various embodiments, the mounting apparatus, and/or a cover, and/or a tension member may comprise metals. In various embodiments, an interface apparatus may comprise a ceramic, or may comprise a plastic, or may comprise a metal with insulating coatings or sleeves, for example, to prevent contacts from shorting out.

In various embodiments, while the electrical swivel systems described herein have been described in the context of aircraft applications, one will appreciate in light of the present disclosure, that the systems described herein may be used on various other applications wherein electrical connectivity is needed across structures moving with respect to each other. For example, the systems described herein may be used on propulsion systems, robotics systems, and industrial systems or processes.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electrical swivel system comprising:
a movable swivel member comprising:
   a movable member mounting apparatus mounting the movable swivel member to a landing gear;
   an external gear connector through which electrical signals are conducted;
   a movable member interface apparatus;
a fixed swivel member comprising:
   a fixed member mounting apparatus mounting the fixed swivel member to an airframe;
   an external aircraft connector through which electrical signals are conducted; and
   a fixed member interface apparatus;
wherein the movable member interface apparatus comprises a movable track comprising a moveable track electrical contact,
wherein the fixed member interface apparatus comprises a fixed track comprising a fixed track electrical contact,
wherein the movable track electrical contact contacts the fixed track electrical contact so that electrical current is conducted,
wherein the movable swivel member and the fixed swivel member comprise complementary shapes whereby the movable swivel member nests within the fixed swivel member,
wherein the movable swivel member travels along an arc length between a first end of the fixed swivel member and a second end of the fixed swivel member, and
wherein the fixed swivel member further comprises a tension member disposed between the fixed member mounting apparatus and the fixed member interface apparatus whereby force is exerted on the fixed track electrical contact.

2. The electrical swivel system according to claim 1, wherein the movable swivel member further comprises a tension member disposed between the movable member mounting apparatus and the movable member interface apparatus whereby force is exerted on the moveable track electrical contact.

3. The electrical swivel system according to claim 1, further comprising a cover.

4. The electrical swivel system according to claim 3, wherein the cover comprises a first rubber portion substantially wrapped around a first portion of the electrical swivel system and a second rubber portion substantially wrapped around a second portion of the electrical swivel system.

5. The electrical swivel system according to claim 2, wherein the tension member comprises a spring.

6. The electrical swivel system according to claim 1, wherein at least one of the fixed track and the movable track comprise a planar surface.

7. The electrical swivel system according to claim 1, wherein the movable track comprises a series of bosses.

8. The electrical swivel system according to claim 7, wherein the movable track electrical contact is positioned on sidewall of at least one of the series of bosses.

9. The electrical swivel system according to claim 7, wherein the fixed track electrical contact is positioned on sidewall of at least one of the series of bosses.

* * * * *